(12) United States Patent
Chada et al.

(10) Patent No.: US 7,778,918 B2
(45) Date of Patent: Aug. 17, 2010

(54) SYSTEM AND METHOD FOR PROVIDING AN INDEX LINKED TO SEPARATELY MANAGED ACCOUNTS

(75) Inventors: Satyanarayan Reddy Chada, New York, NY (US); Kaushik K. Suchak, Princeton Junction, NJ (US); Donald A. MacLean, Long Island City, NY (US)

(73) Assignee: Merrill Lynch & Co., Inc., New York, NY (US)

( * ) Notice: Subject to any disclaimer, the term of this patent is extended or adjusted under 35 U.S.C. 154(b) by 175 days.

(21) Appl. No.: 11/753,877

(22) Filed: May 25, 2007

(65) Prior Publication Data

US 2008/0294567 A1 Nov. 27, 2008

(51) Int. Cl.
*G06Q 40/00* (2006.01)
(52) U.S. Cl. .......................... 705/37; 705/35; 705/36 R
(58) Field of Classification Search .................... 705/35, 705/37
See application file for complete search history.

(56) References Cited

U.S. PATENT DOCUMENTS

| | | | | |
|---|---|---|---|---|
| 5,819,238 | A | 10/1998 | Fernholz | 705/36 |
| 6,061,663 | A | 5/2000 | Bloom et al. | 705/36 |
| 6,947,901 | B1 | 9/2005 | McCabe et al. | 705/26 |
| 7,062,459 | B1 | 6/2006 | Herbst et al. | 705/37 |
| 7,085,738 | B2 | 8/2006 | Tarrant | 705/36 |
| 7,155,468 | B2 | 12/2006 | Weiss | 708/36 R |
| 2002/0184126 | A1 | 12/2002 | McIntyre, Jr. et al. | 705/35 |
| 2003/0074306 | A1 | 4/2003 | Rios et al. | 705/38 |
| 2004/0117284 | A1 | 6/2004 | Speth | 705/36 |
| 2004/0117291 | A1 | 6/2004 | O'Callahan | 705/37 |
| 2005/0038725 | A1 | 2/2005 | Boyle et al. | 705/36 |
| 2005/0060254 | A1 | 3/2005 | Jones | 705/36 |
| 2005/0119962 | A1 | 6/2005 | Bowen et al. | 705/37 |
| 2005/0131795 | A1 | 6/2005 | Barba, Jr. | 705/36 |
| 2005/0171884 | A1 | 8/2005 | Arnott | 705/36 |
| 2006/0015433 | A1 | 1/2006 | Arnott et al. | 705/35 |
| 2006/0143105 | A1 | 6/2006 | Coates | 705/35 |
| 2006/0277124 | A1 | 12/2006 | Gerrietts, II | 705/35 |
| 2007/0005469 | A1 | 1/2007 | Ho et al. | 705/35 |
| 2007/0005471 | A1 | 1/2007 | Ho et al. | 705/35 |

(Continued)

OTHER PUBLICATIONS

"Pimco CommodityRealRetrun DJ-AIGCI TRAKRS to Commence Special Marketing Period on May 26, 2006" by CME 2006.*

(Continued)

*Primary Examiner*—James A Kramer
*Assistant Examiner*—James A Vezeris
(74) *Attorney, Agent, or Firm*—Baker Botts L.L.P.

(57) ABSTRACT

A system comprises a memory operable to store a master index that is based at least in part on a separately managed account (SMA) index, a market index, a first weight associated with the SMA index, and a second weight associated with the market index. The system further comprises a processor communicatively coupled to the memory and operable to update the first weight based at least in part on the market index. The processor is further operable to update the second weight based at least in part on the SMA index. The processor is further operable to update the master index based at least in part on the SMA index, the market index, the updated first weight, and the updated second weight. The processor is further operable to store the updated master index in a memory.

20 Claims, 3 Drawing Sheets

U.S. PATENT DOCUMENTS

| | | | |
|---|---|---|---|
| 2007/0005473 A1 | 1/2007 | Ho et al. | 705/35 |
| 2007/0005474 A1 | 1/2007 | Ho et al. | 705/35 |
| 2007/0005475 A1 | 1/2007 | Ho et al. | 705/35 |
| 2007/0005476 A1 | 1/2007 | Ho et al. | 705/35 |
| 2007/0022033 A1 | 1/2007 | Ho et al. | 705/35 |
| 2007/0055598 A1* | 3/2007 | Arnott et al. | 705/35 |
| 2007/0078744 A1 | 4/2007 | Koss et al. | 705/36 R |

OTHER PUBLICATIONS cme Chicago Mercantile Exchange; Special Executive Report; S-4454; *PIMCO® CommodityRealReturn$^{SM}$ DJ-AIGCI$^{SM}$("PIMCO CRR TRAKRS") to Commence Special Marketing Period* on May 26, 2006; 47 pages.

* cited by examiner

SYSTEM AND METHOD FOR PROVIDING AN INDEX LINKED TO SEPARATELY MANAGED ACCOUNTS

TECHNICAL FIELD OF THE INVENTION

The present invention relates generally to electronic investing and more specifically to a system and method for providing an index linked to separately managed accounts.

BACKGROUND OF THE INVENTION

Traditional trading systems allow traders to pursue various investment schemes, including separately managed accounts. Different separately managed accounts may be managed differently by one or more managers. As a result, one separately managed account may yield a return that is significantly different than the return of another separately managed account. The inconsistency of the returns of different separately managed accounts dissuades some traders from utilizing such accounts.

SUMMARY OF THE INVENTION

In accordance with the present invention, the disadvantages and problems associated with prior trading systems have been substantially reduced or eliminated.

In some embodiments, a system comprises a memory operable to store a master index that is based at least in part on a separately managed account (SMA) index, a market index, a first weight associated with the SMA index, and a second weight associated with the market index. The system further comprises a processor communicatively coupled to the memory and operable to update the first weight based at least in part on the market index. The processor is further operable to update the second weight based at least in part on the SMA index. The processor is further operable to update the master index based at least in part on the SMA index, the market index, the updated first weight, and the updated second weight. The processor is further operable to store the updated master index in a memory.

In other embodiments, a method comprises storing a master index that is based at least in part on a separately managed account (SMA) index, a market index, a first weight associated with the SMA index, and a second weight associated with the market index. The method continues by updating the first weight based at least in part on the market index. The method continues by updating the second weight based at least in part on the SMA index. The method continues by updating the master index based at least in part on the SMA index, the market index, the updated first weight, and the updated second weight. The method concludes by storing the updated master index.

The invention has several important technical advantages. Various embodiments of the invention may have none, some, or all of these advantages. One advantage is that the trading system provides a master index that represents the performance of full notional exposure to both the total return of a market index and an index of separately managed accounts. Another advantage is that the investing system is operable to periodically rebalance the master index such that the notional exposure to the total return of the market index remains approximately equal to the notional exposure to the index of separately managed accounts. Yet another advantage is that the investing system may facilitate equalization swaps for the separately managed accounts. Under the terms of an equalization swap, an owner of a separately managed account may expect to receive a payment that corresponds to the return of the index of separately managed accounts. Other advantages of the present invention will be readily apparent to one skilled in the art from the description and the appended claims.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
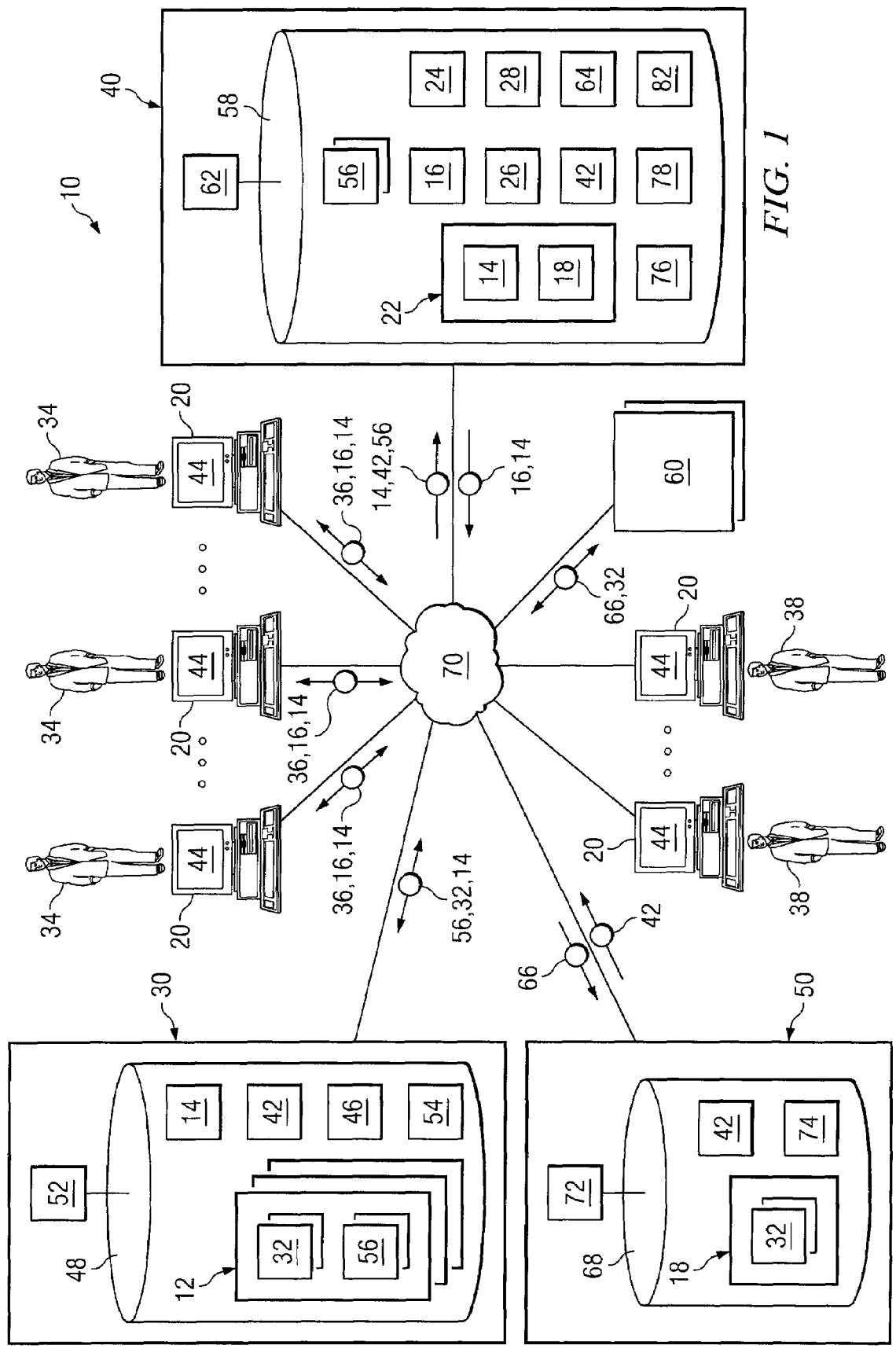
FIG. 1 illustrates an investing system, according to certain embodiments.

FIG. 1 illustrates an investing system 10, according to certain embodiments. Investing system 10 may comprise clients 20, manager servers 30, index server 40, market data server 50, and market centers 60 communicatively coupled by network 70. Investing system 10 is generally operable to provide investment accounts that are associated with one or more financial indices.

In some embodiments, investing system 10 is operable to maintain separately managed accounts (SMAs) 12 and to provide an index that represents the value of SMAs 12. This index may be referred to as SMA index 14. Investing system 10 is further operable to provide a master index 16 that represents the performance of full notional exposure to both the total return of a market index 18 and SMA index 14. Market index 18 and SMA index 14 may be referred to as component indices 22 of master index 16. In some embodiments, investing system 10 calculates master index 16 based at least in part on a financing value 24 as well as market index 18 and SMA index 14. By deducting financing value 24, investing system 10 may configure master index 16 to provide full exposure to both component indices 22 (i.e., market index 18 and SMA index 14). In some embodiments, the effect of financing value 24 may be embedded in market index 18 and/or SMA index 14.

In calculating master index 16, investing system 10 may proportion market index 18 and SMA index 14 according to a particular weighting scheme. In some embodiments, market index 18 may be weighted according to market index weight 26 and SMA index 14 may be weighted according to SMA index weight 28. Investing system 10 may periodically rebalance market index weight 26 and SMA index weight 28 such that the notional exposure to the total return of the market index 18 approximately equals the notional exposure to the SMA index 14. In some embodiments, the rebalancing is based at least in part on reallocating assumed gains or losses attributed to one component index 22, accumulated since the last rebalancing, to the other component index 22.

As explained above, master index 16 may be based at least in part on market index 18. Market index 18 is a measure of the market value and/or performance of the particular investment instruments 32 that underlie market index 18. Market index 18 may be predicated on any suitable investment instruments 32 such as, for example, equities, debt, currencies, commodities, stocks, bonds, futures contracts, derivatives, and/or any suitable trading product. In some embodiments, market index 18 may represent an equities index such as, for example, the Dow Jones Industrial Average, the German DAX, the British FTSE 100, the S&P 500 Total Return Index, and/or other suitable equities index. In other embodiments, market index 18 may represent a commodities index such as, for example, the Dow Jones-AIG Commodity Index, the S&P Commodity Index, and/or other suitable commodities index. In other embodiments, market index 18 may represent a bond index such as, for example, the Dow Jones Corporate Bond Index, the Lehman Aggregate Bond Index, and/or any suitable bond index. In other embodiments, market index 18 may represent one or more currencies such as, for example, the E.U. Euro, the Swiss franc, the British pound, the Japanese yen, and/or suitable combination of currencies and/or currency indices. In yet other embodiments, market index 18 may represent one or more hedge fund indices such as, for example, the HFRI Fund Weighted Composite Index, the CSFB Credit Suisse/Tremont Hedge Fund Index, the FTSE Hedge Index, the Dow Jones Hedge Fund Index, the Eurekahedge Hedge Fund Index, and/or any suitable hedge fund index.

SMA index 14 may be a component of master index 16. SMA index 14 is a measure of the performance of a plurality of separately managed accounts (SMAs) 12. The term "separately managed account" refers to an account of investment instruments 32 that are managed by a financial professional on behalf of an account owner 34. A SMA 12 may be distinguished from a mutual fund in that an investor in a mutual fund does not own the investment instruments 32 that underlie the mutual fund. In contrast, owner 34 of a particular SMA 12 owns the investment instruments 32 that underlie the particular SMA 12. Because owner 34 of SMA 12 actually owns the investment instruments 32 that underlie SMA 12, owner 34 may have more control over which investment instruments 32 are held in SMA 12. Thus, in some embodiments, SMA 12 provides owner 34 with a greater opportunity for customization than a mutual fund.

In some embodiments, investing system 10 may ensure that each owner 34 of a respective SMA 12 receives the return of SMA index 14. To achieve this result, investing system 10 may require each owner 34 to execute, with a counterparty, a swap based at least in part on SMA index 14. In some embodiments, the swap may be referred to as an equalization swap 36 and the party with which owner 34 executes the swap 36 may be referred to as an equalization swap counterparty. Under the terms of equalization swap 36, owner 34 of a particular SMA 12 may be obligated to pay to the equalization swap counterparty the return on the particular SMA 12 and, in exchange, the equalization swap counterparty may be obligated to pay owner 34 the return on SMA index 14. In some embodiments, owner 34 of the particular SMA 12 may be further obligated to pay to the equalization swap counterparty a fee for executing equalization swap 36. By obligating owners 34 of SMAs 12 to execute equalization swaps 36, investing system 10 may ensure that each owner 34 receives the return on SMA index 14.

In configuring master index 16 to provide full exposure to both component indices 22 (i.e., market index 18 and SMA index 14), investing system 10 may deduct financing value 24. In some embodiments, financing value 24 is a structural cost component of master index 16 that represents the assumed financing cost associated with obtaining full exposure to both component indices 22 of master index 16. Master index 16 may be periodically rebalanced such that, at the time of rebalancing, substantially all of the targeted exposure to master index 16 is invested in both the total return of market index 18 and SMA index 14. Consequently, the deduction of financing value 24 may represent a cost adjustment that is inherently part of obtaining full exposure to both component indices 22. Financing value 24 may correspond to any suitable interest rate. In some embodiments, financing value 24 corresponds to a short-term interbank lending rate. For example, financing value 24 may correspond to the BBA One Month USD Libor. In other embodiments, financing value 24 may be based at least in part on a prime rate, federal funds rate, mortgage rate, wholesale rate, retail rate, discount rate, and/or any number and combination of suitable lending rates.

As explained above, investing system 10 may comprise one or more clients 20. Client 20 represents any suitable local or remote end-user device that may be used by owners 34 and/or managers 38 to access one or more elements of investing system 10, such as manager server 30. In some embodiments, owner 34 may use client 20 to receive information from manager 38, to monitor the status of SMA 12, to receive trade confirmations, to view market data 42, and/or to communicate with various components of investing system 10. According to certain embodiments, manager 38 may use client 20 to communicate with owner 34 of SMA 12, to submit trading orders to market centers 60, to monitor the status of SMA 12, to receive information regarding investing guidelines 46, and/or to communicate with various components of investing system 10. A particular client 20 may comprise a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of investing system 10. Client 20 may also comprise any suitable user interface such as a display, microphone, keyboard, or any other appropriate terminal equipment according to particular configurations and arrangements. It will be understood that investing system 10 may comprise any number and combination of clients 20.

Clients 20 may be used by owners 34 and/or managers 38. The term "owner" refers to any party that has an ownership interest in a particular SMA 12. In some embodiments, owner 34 may be an individual. In other embodiments, owner 34 may be a legal entity such as, for example, a corporation. In certain embodiments, owner 34 may be a trust that maintains SMA 12 for the benefit of a designated beneficiary. The designated beneficiary may be referred to as a beneficial owner 34 of SMA 12.

The term "manager" is meant to broadly apply to any individual or entity that manages a particular SMA 12 on behalf of owner 34 of the particular SMA 12. Manager 38 may be a money manager, agent, broker, financial professional, legal entity, and/or any machine or mechanism that is capable of managing SMA 12 in investing system 10. In some embodiments, owners 34 and managers 38 may be referred to as users of clients 20 in investing system 10.

In some embodiments, client 20 may comprise a graphical user interface (GUI) 44. GUI 44 is generally operable to tailor and filter data presented to user. GUI 44 may provide user with an efficient and user-friendly presentation of SMA index 14, market index 18, trading orders, market data 42, and/or other suitable information. GUI 44 may comprise a plurality of displays having interactive fields, pull-down lists, and buttons operated by user. In one example, GUI 44 presents relevant market data 42 to user and conceals the remaining information to reduce visual clutter. Then, upon receiving a request from user, GUI 44 expands the visual representation of market data 42 to display account information, market information, and/or other suitable information. GUI 44 may include multiple levels of abstraction including groupings and boundaries. It should be understood that the term graphical user interface 44 may be used in the singular or in the plural to describe one or more graphical user interfaces 44 and each of the displays of a particular graphical user interface 44.

Owners 34 and/or managers may use clients 20 to communicate with manager server 30. Manager server 30 is generally operable to store SMAs 12, receive market data 42, and determine the value of a particular SMA 12 based at least in part on market data 42. According to certain embodiments, manager server 30 may transmit the respective value of each SMA 12 to index server 40. Manager server 30 is generally operable to route trading orders from managers to market centers 60 and to record trade confirmations received from market centers 60. In some embodiments, manager server 30 is operable to monitor SMAs 12 to determine whether each SMA 12 complies with investing guidelines 46. Manager server 30 may be maintained and/or operated by a bank, fund manager, and/or other suitable financial services company. In some embodiments, manager server 30 may be maintained and/or operated by a fund management company such as, for example, the Pacific Investment Management Company (PIMCO). In other embodiments, manager server 30 may be maintained and/or operated by a banking institution such as, for example, JPMorgan Chase & Co.

Manager server 30 may comprise any suitable combination of hardware and/or software implemented in one or more modules to provide the described functions and operations. In some embodiments, manager server 30 may comprise a general-purpose personal computer (PC), a Macintosh, a workstation, a Unix-based computer, a server computer, or any suitable processing device. In some embodiments, the functions and operations described above may be performed by a pool of multiple manager servers 30. A particular manager server 30 may comprise a manager memory 48 and a manager processor 52.

Manager memory 48 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as market data 42. Although FIG. 1 illustrates manager memory 48 as internal to manager server 30, it should be understood that manager memory 48 may be internal or external to manager server 30, depending on particular implementations. Also, manager memory 48 may be separate from or integral to other memory devices to achieve any suitable arrangement of memory devices for use in investing system 10.

Manager memory 48 is generally operable to store SMAs 12, investing guidelines 46, market data 42, and manager logic 54. A particular SMA 12 represents an account of investment instruments 32 that are managed by a financial professional on behalf of an account owner 34. Each SMA 12 in manager memory 48 comprises a plurality of investment instruments 32 such as, for example, equities, debt, currencies, commodities, stocks, bonds, futures contracts, derivatives, and/or any suitable trading product. Different SMAs 12 may hold different amounts and/or combinations of investment instruments 32. In some embodiments, storing a particular SMA 12 comprises storing an electronic profile of the particular SMA 12. The profile may comprise the current value of the particular SMA 12 and/or information regarding the particular investment instruments 32 held in the particular SMA 12. The current value of a particular SMA 12 may be referred to as SMA value 56. In some embodiments, manager server 30 may periodically update the values of SMAs 12 stored in manager memory 48. To update SMA value 56 of a particular SMA 12, manager server 30 may determine from market data 42 the current values of investment instruments 32 held in the particular SMA 12.

Manager memory 48 may store investing guidelines 46. Investing guidelines 46 generally comprise rules, standards, policies, limitations, and/or any number and combination of suitable guidelines regarding the purchasing, selling, trading, and/or managing of investment instruments 32. Investing guidelines 46 may be based on one or more investing strategies, which may or may not be linked or correlated to market index 18. Investing guidelines 46 may be based on a strategy that hedges or enhances a currency exposure, a strategy that is associated with an inflation index, and/or any suitable number and combination of investing strategies.

Investing guidelines 46 may impose constraints on the discretion of manager 38 in selecting the particular investment instruments 32 held in SMA 12. In some embodiments, investing system 10 may require each SMA 12 that underlies SMA index 14 to comply with investing guidelines 46. For example, investing guidelines 46 may specify concentration criteria and/or rating requirements for investment instruments 32 in SMA 12. As another example, investing guidelines 46 may specify the permissible types of investment instruments 32 that may be held in SMA 12. In some embodiments, the permissible types of investment instruments 32 include but are not limited to U.S. Treasury and agency notes and bonds, U.S. government agency mortgage-backed securities (including TBAs, CMOs, and REMIC regular interests), inflation-indexed exempt securities, securities issued by foreign governments, mortgage derivatives, bank loans, exempt money market derivatives, futures, forwards, exchange traded swap futures, options, caps, floors, swaps, and/or credit default swaps. In certain embodiments, investing system 10 may allow SMA 12 to directly hold the foregoing types of investment instruments 32 but may prohibit SMA 12 from directly holding other types of investment instruments 32. According to certain embodiments, investing guidelines 46 may allow SMA 12 to have indirect exposure (via futures, forwards, and/or swaps) to corporate debt securities, non-agency mortgage-backed securities, asset backed securities, emerging market debt securities, municipal securities, non-U.S. Dollar denominated securities issued by corporations, and/or event-linked securities. Although particular examples of investing guidelines 46 are described above, it should be understood that investing guidelines 46 may comprise any suitable investing rules.

Manager memory 48 may store manager logic 54. Manager logic 54 generally comprises rules, algorithms, code, tables, and/or other suitable instructions for performing the described functions and operations.

Manager memory 48 is communicatively coupled to manager processor 52. Manager processor 52 is generally operable to execute manager logic 54 stored in manager memory 48 to determine whether SMAs 12 comply with investing guidelines 46 stored in manager memory 48. Manager processor 52 is further operable to route trading orders, monitor market data 42, update SMAs 12 stored in manager memory 48, and transmit SMA values 56 to index server 40. Manager processor 52 may comprise any suitable combination of hardware and software implemented in one or more modules to provide the described function or operation.

Manager server 30 may be communicatively coupled to index server 40 via network 70. Index server 40 is generally operable to receive SMA values 56 from manager server 30, update SMA index 14, determine market index 18 from market data 42, rebalance SMA index weight 28 and market index weight 26, and update master index 16. Index server 40 is further operable to determine the return of SMA index 14, determine the returns of the respective SMAs 12 stored in manager server 30, and process a respective equalization swap 36 for each SMA 12 stored in manager server 30. Index server 40 may be maintained and/or operated by any suitable entity. In some embodiments, index server 40 may be maintained and/or operated by a banking or financial services entity such as, for example, Dow Jones & Company, Standard & Poor's, and/or any suitable entity. In other embodiments, index server 40 may be maintained and/or operated by an exchange such as, for example, the New York Stock Exchange, the London Stock Exchange, the Chicago Board Options Exchange, the Chicago Mercantile Exchange, and/or any suitable U.S. or non-U.S. exchange. Index server 40 may be maintained and/or operated by an entity that is the same as or different from the entity that maintains and/or operates manager server 30.

Index server 40 may comprise any suitable combination of hardware and/or software implemented in one or more modules to provide the described functions and operations. In some embodiments, index server 40 may comprise a general-purpose personal computer (PC), a Macintosh, a workstation, a Unix-based computer, a server computer, or any suitable processing device. In some embodiments, the functions and operations described above may be performed by a pool of multiple index servers 40. A particular index server 40 may comprise an index memory 58 and an index processor 62.

Index memory 58 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as market data 42. Although FIG. 1 illustrates index memory 58 as internal to index server 40, it should be understood that index memory 58 may be internal or external to index server 40, depending on particular implementations. Also, index memory 58 may be separate from or integral to other memory devices to achieve any suitable arrangement of memory devices for use in investing system 10.

Index memory 58 is generally operable to store SMA values 56, SMA index 14, market index 18, SMA index weight 28, market index weight 26, master index 16, financing value 24, market data 42, and index logic 64. Index logic 64 generally comprises rules, algorithms, code, tables, and/or other suitable instructions for performing the described functions and operations.

Index memory 58 is communicatively coupled to index processor 62. Index processor 62 is generally operable to execute index logic 64 to update SMA index 14 based at least in part on SMA values 56 stored in index memory 58. Index processor 62 is further operable to update master index 16 based at least in part on SMA index 14, market index 18, SMA index weight 28, market index weight 26, and financing value 24. Index processor 62 may comprise any suitable combination of hardware and software implemented in one or more modules to provide the described function or operation.

Manager server 30, index server 40, and/or clients 20 may be communicatively coupled to one or more market centers 60. Market center 60 is generally operable to receive and execute trading orders from managers. Once a particular trading order is executed, market center 60 is operable to generate and transmit a trade confirmation message to manager server 30 and/or client 20. Market center 60 is further operable to transmit trading data 66 to market data server 50. Trading data 66 may comprise information regarding trading activities in market center 60. In particular, trading data 66 may comprise information regarding best bid prices, best offer prices, trading volumes, volatility, and/or any other suitable information regarding trading activity in market center 60. In some embodiments, trading data 66 represents raw data regarding conditions in market center 60.

Market centers 60 may comprise all manner of order execution venues including exchanges, Electronic Communication Networks (ECNs), Alternative Trading Systems (ATSs), market makers, or any other suitable market participants. Each market center 60 may maintain a bid and offer price for at least one investment instrument 32 by standing ready, willing, and able to buy or sell that investment instrument 32 at publicly quoted prices, also referred to as market center prices. Different market centers 60 may provide different market center prices for particular investment instruments 32. For example, a particular market center 60 may offer a particular bid price and/or offer price for a particular investment instrument 32, while another market center 60 may offer a different bid price and/or offer price for the same investment instrument 32.

Market center 60 may be communicatively coupled via network 70 to market data server 50. Market data server 50 is generally operable to receive and process trading data 66 from market center 60. Market data server 50 may process trading data 66 to generate market data 42. Market data 42 may comprise current and/or historical information regarding any suitable index, financial instrument, mutual fund, hedge fund, exchange traded fund ("ETF"), investment instrument 32, and/or any suitable number and combination of indicators regarding investing system 10. In particular, market data 42 may comprise current and/or historical values of market index 18 and financing value 24. In some embodiments, market data server 50 is operable to receive master index 16 from index server 40. Market data server 50 may provide an Internet portal through which market data 42 (including master index 16 and/or SMA index 14) may be displayed by clients 20 to users. In some embodiments, market data server 50 may be operated by a financial news service organization such as, for example, Bloomberg, L.P. In other embodiments, market data server 50 may be operated by the particular market center(s) 60 in which master index 16 is listed, such as, for example, the Chicago Mercantile Exchange. In other embodiments, market data server 50 may be operated by a market maker, brokerage firm, bank, and/or any suitable financial services entity.

Market data server 50 may comprise any suitable combination of hardware and/or software implemented in one or more modules to provide the described functions and operations. In some embodiments, market data server 50 may comprise a general-purpose personal computer (PC), a Macintosh, a workstation, a Unix-based computer, a server computer, or any suitable processing device. In some embodiments, the functions and operations described above may be performed by a pool of multiple market data servers 50. A particular market data server 50 may comprise a market data memory 68 and a market data processor 72.

Market data memory 68 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information. Although FIG. 1 illustrates market data memory 68 as internal to market data server 50, it should be understood that market data memory 68 may be internal or external to market data server 50, depending on particular implementations. Also, market data memory 68 may be separate from or integral to other memory devices to achieve any suitable arrangement of memory devices for use in investing system 10.

Market data memory 68 is generally operable to store trading data 66 from market centers 60. Market data memory 68 is further operable to store market data logic 74. Market data logic 74 generally comprises rules, algorithms, code, tables, and/or other suitable instructions for generating market data 42 based at least in part on trading data 66.

Market data memory 68 may be communicatively coupled to market data processor 72. Market data processor 72 is generally operable to execute market data logic 74 to generate market data 42. Market data processor 72 comprises any suitable combination of hardware and software implemented in one or more modules to provide the described function or operation.

As explained above, clients 20, manager server 30, index server 40, market data servers 50, and market centers 60 may be communicatively coupled via one or more networks 70. Network 70 may represent any number and combination of wireline and/or wireless networks suitable for data transmission. Network 70 may, for example, communicate internet protocol packets, frame relay frames, asynchronous transfer mode cells, and/or other suitable information between network addresses. Network 70 may include one or more intranets, local area networks, metropolitan area networks, wide area networks, cellular networks, all or a portion of the Internet, and/or any other communication system or systems at one or more locations.

It should be understood that the internal structure of investing system 10 and the servers, processors, and memory devices associated therewith is malleable and can be readily changed, modified, rearranged, or reconfigured to achieve the intended operations of investing system 10.

In operation, index server 40 is operable to determine and display master index 16 that represents the performance of full notional exposure to both the total return of market index 18 and SMA index 14. In some embodiments, at the inception of master index 16, index server 40 determines a weight for the total return of market index 18 ("market index weight 26") and a weight for SMA index 14 ("SMA index weight 28") such that the product of the value of component index 22 and its corresponding weight equals the value of a notional investment.

Each component index weight remains constant until index server 40 rebalances master index 16. In some embodiments, after index server 40 rebalances master index 16, the value of master index 16 at any given time is the sum of the product of the current market index weight 26 and the current total return value of market index 18 and the product of the current value of SMA index 14 and the current SMA index weight 28 minus a financing value 24. According to other embodiments, the effect of financing value 24 may be embedded in market index 18 and/or SMA index 14.

In some embodiments, index server 40 may rebalance master index 16 after a configurable period of time. Index server 40 may rebalance master index 16 weekly, monthly, quarterly, or according to any suitable interval of time. The day in each period on which index server 40 rebalances master index 16 may be referred to as the "rebalancing date." Index server 40 may rebalance master index 16 such that the notional exposure of master index 16 to the total return of market index 18 approximately equals the notional exposure of master index 16 to SMA index 14. In some embodiments, the rebalancing may be accomplished by reallocating the assumed gains or losses attributed to one component index 22, accumulated since the last rebalancing, to the other component index 22. The amounts to be reallocated between component indices 22 may be referred to as the "market adjustment 76" and the "SMA adjustment 78," described below.

According to certain embodiments, index server 40 determines market adjustment 76 and SMA adjustment 78 on the rebalancing date. In other embodiments, market information needed for the rebalancing may not be available on a real-time basis. In such embodiments, index server 40 may be configured to determine market adjustment 76 and SMA adjustment 78 one or more business days prior to the rebalancing date. The day in each period on which index server 40 determines market adjustment 76 and SMA adjustment 78 may be referred to as the "reconstitution date."

On the reconstitution date, index server 40 may determine market adjustment 76. Market adjustment 76 may represent the gain or loss associated with the notional exposure to the total return of market index 18 from the prior reconstitution date to the current reconstitution date. Index server 40 may determine market adjustment 76 based at least in part on past and current values of market index 18 and market index weight 26.

Index server 40 may further determine SMA adjustment 78. SMA adjustment 78 may represent the gain or loss of the notional exposure to SMA index 14 from the prior reconstitution date to the current reconstitution date. Index server 40 may determine market adjustment 76 based at least in part on past and current values of SMA index 14 and SMA index weight 28.

In some embodiments, the net change in the exposure to component indices 22 will also be reflected in an equivalent net increase or decrease in the notional amount underlying financing value 24. On the rebalancing date, index server 40 may determine financing value adjustment 82. Financing value adjustment 82 may represent the accumulated expense on the notional amount of the assumed financing represented by the financing value 24 for the period from (but excluding) the last rebalancing date to (and including) the current rebalancing date.

On the rebalancing date, index server 40 may cross-balance the weights of component indices 22. Cross-balancing generally refers to the procedure of using the adjustment associated with one component index 22 to update the weight of the other component index 22. According to this procedure, index server 40 may increase or decrease market index weight 26 (i.e., the notional exposure to the total return of market index 18) by an amount equal to the SMA adjustment 78 minus the financing value adjustment 82 divided by the value of market index 18 on the present rebalancing date. Index server 40 may increase or decrease SMA index weight 28 (i.e., the notional exposure to the SMA index 14) by an amount equal to the market adjustment 76 minus the financing value adjustment 82 divided by the value of SMA index 14 on the present rebalancing date.

In conjunction with updating market index weight 26 and SMA index weight 28, index server 40 may reset financing value 24 by increasing or decreasing the notional amount underlying the financing value 24 by an amount equal to the sum of SMA adjustment 78 and market adjustment 76 minus financing value adjustment 82.

Based at least in part on the foregoing cross-balancing procedure, at the conclusion of each rebalancing, the portion of master index 16 that is deemed to be invested in each component of master index 16 may be approximately equally weighted, representing full notional exposure to each of the total return of market index 18 and SMA index 14. The notional amount underlying financing value 24 may reflect the amount of the assumed borrowing required to finance such exposure to component indices 22.

Figure 2:
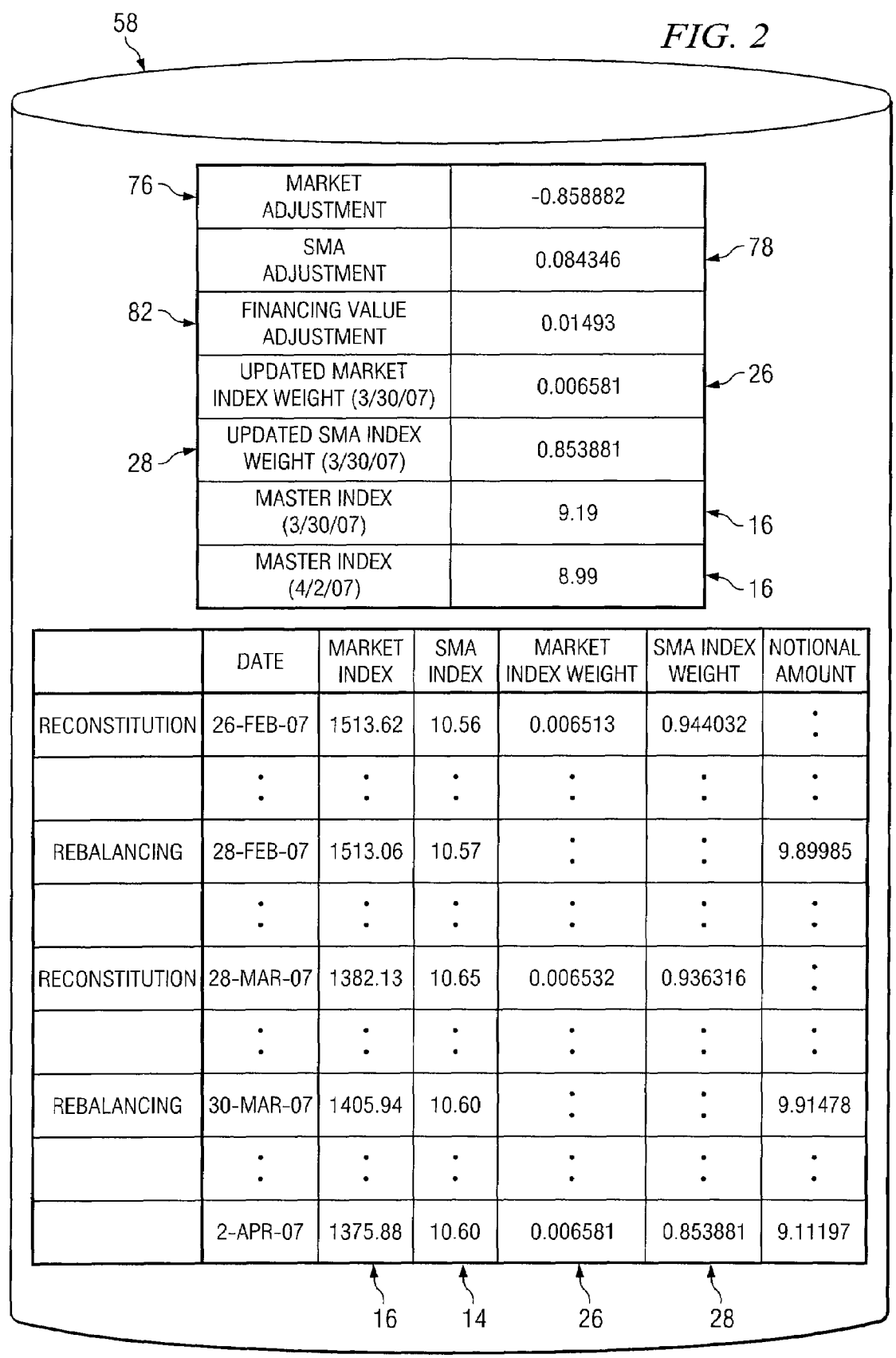
FIG. 2 illustrates an example rebalancing of a master index, according to certain embodiments.

FIG. 2 illustrates an example rebalancing of master index 16, according to certain embodiments. In the present example, index server 40 is configured to rebalance master index 16 on the last business day of each month ("rebalancing date"). In this present example, because certain data may not be available in real-time, index server 40 is configured to begin the rebalancing of master index 16 as of the "reconstitution date," which is two business days prior to the rebalancing date. The present example illustrates an example rebalancing for the last business day of March 2007 (i.e., Mar. 30, 2007).

Index memory 58 is configured to store historic information regarding market index 18, SMA index 14, market index weight 26, SMA index weight 28, and notional amount. As explained above, index server 40 may rebalance market index 18 based at least in part on current and prior values of market index 18 and SMA index 14. In the present example, on the prior reconstitution date (Feb. 26, 2007), market index 18 was 1513.62 and SMA index 14 was 10.56, market index weight 26 was 0.006513, SMA index weight 28 was 0.944032. On the prior rebalancing date (Feb. 28, 2007), market index 18 was 1513.06, SMA index 14 was 10.57, and the notional amount underlying financing value 24 was 9.89985.

In the present example, index server 40 is configured to determine market adjustment 76 as of the current rebalancing date. In particular, index server 40 is configured to determine market adjustment 76 according to the following formula, which may be stored in index memory 58:

$$A_m = \text{Weight}_{m\_c} \times (\text{Market}_{c\_rc} - \text{Market}_{p\_rb}) + \text{Weight}_{m\_p} \times (\text{Market}_{p\_rb} - \text{Market}_{p\_rc})$$

In the foregoing formula, $A_m$ represents market adjustment 76, $\text{Weight}_{m\_c}$ represents market index weight 26 on the current reconstitution date, $\text{Market}_{c\_rc}$ represents the value of market index 18 on the current reconstitution date, $\text{Market}_{p\_rb}$ represents the value of market index 18 on the prior rebalancing date, $\text{Weight}_{m\_p}$ represents market index weight 26 on the prior reconstitution date, and $\text{Market}_{p\_rc}$ represents the value of market index 18 on the prior reconstitution date.

In the present example, index server 40 determines from market data 42, stored in index memory 58 and/or received from market centers 60, that $\text{Market}_{c\_rc}$ is 1382.13, $\text{Market}_{p\_rb}$ is 1513.06, and $\text{Market}_{p\_rc}$ is 1513.62. From prior market index weights 26 stored in index memory 58, index server 40 determines that $\text{Weight}_{m\_c}$ is 0.006532 and $\text{Weight}_{m\_p}$ is 0.006513. According to the foregoing formula, index server 40 determines that, as of the current reconstitution date, market adjustment 76 ($A_m$) is −0.858882.

In the present example, index server 40 is configured to determine SMA adjustment 78 in conjunction with determining market adjustment 76. In particular, index server 40 is configured to determine SMA adjustment 78 according to the following formula, which may be stored in index memory 58:

$$A_s = \text{Weight}_{s\_c} \times (SMA_{c\_rc} - SMA_{p\_rb}) + \text{Weight}_{s\_p} \times (SMA_{p\_rb} - SMA_{p\_rc})$$

In the foregoing formula, $A_s$ represents SMA adjustment 78, $\text{Weight}_{s\_c}$ represents SMA index weight 28 on the current reconstitution date, $SMA_{c\_rc}$ represents the value of SMA index 14 on the current reconstitution date, $SMA_{p\_rb}$ represents the value of SMA index 14 on the prior rebalancing date, $\text{Weight}_{s\_p}$ represents SMA index weight 28 on the prior reconstitution date, $SMA_{p\_rc}$ represents the value of SMA index 14 on the prior reconstitution date.

In the present example, index server 40 determines, from prior values of SMA index 14 stored in index memory 58, that $SMA_{c\_rc}$ is 10.65, $SMA_{p\_rb}$ is 10.57, and $SMA_{p\_rc}$ is 10.56. From prior SMA index weights 28 stored in index memory 58, index server 40 determines that $\text{Weight}_{s\_c}$ is 0.936316 and that $\text{Weight}_{s\_p}$ is 0.944032. According to the foregoing formula, index server 40 processes the foregoing information to determine that, as of the current reconstitution date, SMA adjustment 78 ($A_s$) is 0.084346. Index server 40 is operable to store the determined market adjustment 76 and SMA adjustment 78 in index memory 58.

In the present example, index server 40 is configured to determine market adjustment 76 and SMA adjustment 78 as of the reconstitution date. Subsequently, on the rebalancing date, index server 40 may determine the adjustment associated with financing value 24, the new market index weight 26, and the new SMA index weight 28. In the present example, index server 40 determines financing value adjustment 82 according to the following formula, which may be stored in index memory 58:

$$A_f = FR_c - FR_p$$

In the foregoing formula, $A_f$ represents the financing value adjustment 82, $FR_c$ represents the notional amount underlying the financing value 24 of master index 16 at the close of the current rebalancing date and $FR_p$ represents the notional amount underlying the financing value 24 of master index 16 as reset on the prior rebalancing date. In the present example, index server 40 determines that $FR_c$ is 9.91478 and that $FR_p$ is 9.89985. According to the foregoing formula, index server 40 determines that financing value adjustment 82 ($A_f$) is 0.01493. Index server 40 may store the determined financing value adjustment 82 in index memory 58.

In the present example, index server 40 is configured to apply a cross-balancing technique to determine the new market index weight and SMA index weight 28. According to the cross-balancing technique, index server 40 may determine the new market index weight based at least in part on the SMA adjustment 78. Index server 40 may further determine the new SMA index weight 28 based at least in part on the market adjustment 76. This cross-balancing technique may allow index server 40 to reallocate assumed gains or losses attributed to one component index 22, accumulated since the last rebalancing, to the other component index 22.

According to the cross-balancing technique, index server 40 is configured to determine the new market index weight according to the following formula:

$$\text{Weight}_{m\_n} = \text{Weight}_{m\_c} + (A_s - A_f)/\text{Market}_{c\_rb}$$

In the foregoing formula, $\text{Weight}_{m\_n}$ represents the new market index weight, $\text{Weight}_{m\_c}$ represents market index weight on the current reconstitution date, $A_s$ represents SMA adjustment 78, $A_f$ represents financing value adjustment 82, and $\text{Market}_{c\_rb}$ represents the value of market index 18 on the current rebalancing date.

In the foregoing example, index server 40 determines, from adjustment values stored in index memory 58, that $A_s$ is 0.084346 and that $A_f$ is 0.01493. From weights of component indices 22 stored in index memory 58, index server 40 determines that $\text{Weight}_{m\_c}$ 0.006532. From market data 42 stored in index memory 58, index server 40 determines that $\text{Market}_{c\_rb}$ is 1405.94. According to the foregoing formula, index server 40 determines that the new market index weight ($\text{Weight}_{m\_n}$) is 0.006581. Index server 40 may store the new market index weight in index memory 58. During the following month, index server 40 may calculate daily values of master index 16 based at least in part on the new market index weight. On the next rebalancing date, index server 40 is operable to update market index weight.

According to the cross-balancing technique, index server 40 is operable to determine the new SMA index weight 28 according to the following formula:

$$Weight_{s\_n} = Weight_{s\_c} + (A_m - A_f)/SMA_{c\_rb}$$

In the foregoing formula, $Weight_{s\_n}$ represents the new SMA index weight 28, $Weight_{s\_c}$ represents SMA index weight 28 on the current reconstitution date, $A_m$ represents market adjustment 76, $A_f$ represents financing value adjustment 82, and $SMA_{c\_rb}$ represents the value of SMA index 14 on the current rebalancing date.

In the foregoing example, index server 40 determines, from adjustment values stored in index memory 58, that $A_m$ is −0.858882 and that $A_f$ is 0.01493. From weights of component indices 22 stored in index memory 58, index server 40 determines that $Weight_{s\_c}$ 0.936316. From market data 42 stored in index memory 58, index server 40 determines that $SMA_{c\_rb}$ is 10.60. According to the foregoing formula, index server 40 determines that the new SMA index weight 28 ($Weight_{s\_n}$) is 0.853881. Index server 40 may store the new SMA index weight 28 in index memory 58. In some embodiments, during the month following a particular rebalancing date, index server 40 may use the updated SMA index weight 28 and the updated market index weight 26 to determine daily values of master index 16.

According to certain embodiments, on a particular rebalancing date (e.g., the last day of the month), index server 40 may use SMA index weight 28 and market index weight 26 from the prior rebalancing date to determine the value of master index 16 on the particular rebalancing date. An example illustrates certain embodiments. As explained above, on Mar. 30, 2007, market index 18 is 1405.94, SMA index 14 is 10.60, and the notional amount underlying financing value 24 is 9.91478. In this example, index server 40 uses SMA index weight 28 of 0.936316 and market index weight 26 of 0.006532—as calculated on the prior rebalancing date (i.e., Feb. 28, 2007)—to determine the value of master index 16 on Mar. 30, 2007. In this example, index server 40 determines the current value of master index 16 according to the following formula, which may be stored in index memory 58:

$$Master_t = (Market_t \times Weight_{m\_n}) + (SMA_t \times Weight_{s\_n}) - FR_t$$

In the foregoing formula, $Master_t$ represents the value of master index 16 at the close of a particular day, $Market_t$ represents the value of market index 18 at the close of the particular day, $Weight_{m\_n}$ represents market index weight 26 as calculated on the prior rebalancing date, $SMA_t$ represents the value of SMA index 14 at the close of the particular day, $Weight_{s\_n}$ represents SMA index weight 28 as calculated on the prior rebalancing date, and $FR_t$ represents the notional amount underlying financing value 24 at the close of the particular day. Accordingly, in this example, index server 40 determines that $Market_t$ is 1405.94, $Weight_{m\_n}$ is 0.006532, $SMA_t$ is 10.60, $Weight_{s\_n}$ is 0.936316, and $FR_t$ is 9.91478. Based on the foregoing formula, index server 40 determines that master index 16 is 9.19. Index server 40 may transmit the determined value of master index 16 to market data server 50, market centers 60, manager server 30, and/or clients 20. In some embodiments, index server 40 may cause one or more clients 20 to display the determined value of master index 16 to users.

As explained above, during the month following a particular rebalancing date, index server 40 may use SMA index weight 28 and market index weight 26 that were calculated on the particular rebalancing date to determine daily values of master index 16. For example, on Apr. 2, 2007, index server may use the new SMA index weight 28 and the new market index weight 26—as calculated on the prior rebalancing date (i.e., Mar. 30, 2007)—to determine the current value of master index 16. Index server 40 may determine master index 16 according to the foregoing formula (i.e., $Master_t = (Market_t \times Weight_{m\_n}) + (SMA_t \times Weight_{s\_n}) - FR_t$).

In this example, on Apr. 2, 2007, market index 18 is 1375.88, SMA index 14 is 10.60, and the notional amount underlying financing value 24 is 9.11197. As determined on the prior rebalancing date (i.e., Mar. 30, 2007), market index weight 26 is 0.006581 and SMA index weight 28 is 0.853881. Accordingly, index server 40 determines that $Market_t$ is 1375.88, $SMA_t$ is 10.60, $Weight_{m\_n}$ is 0.006581, $Weight_{s\_n}$ is 0.853881, and $FR_t$ is 9.11197. Based on the foregoing formula, index server 40 determines that master index 16 is 8.99 at the close of business on Apr. 2, 2007. Index server 40 may transmit the determined value of master index 16 to market data server 50, market centers 60, manager server 30, and/or clients 20. In some embodiments, index server 40 may cause one or more clients 20 to display the determined value of master index 16 to users.

According to certain embodiments, index server 40 may be configured to use the daily closing values of SMA index 14, market index 18, and/or financing value 24 to update master index 16 at the close of each business day. In other embodiments, index server 40 is operable to update master index 16 in real-time or substantially real-time based at least in part on real-time or substantially real-time values of SMA index 14, market index 18, weights of components indices 22, and/or financing value 24.

As explained above, SMA index 14 may represent one component index 22 underlying master index 16. In some embodiments, SMA index 14 is predicated on the performance of a plurality of SMAs 12 on a weighted average basis. According to certain embodiments, SMA management fees, which may be calculated on a percentage per annum basis, are deducted from the calculation of SMA index 14. The deduction of these fees results in excluding from SMA index 14 the costs associated with maintaining the plurality of SMAs 12 that comprise SMA index 14.

In certain embodiments, each SMA 12 may be actively managed by one or more managers. In some embodiments, the strategy that manager 38 may employ in managing SMA 12 may be constrained by one or more investing guidelines 46 stored in manager memory 48. According to investing guidelines 46, manager 38 may structure SMA 12 to provide favorable returns relative to risk or volatility.

In some embodiments, manager server 30 and/or index server 40 may periodically determine the value of each SMA 12. The value of SMA 12 may be determined by calculating the total value of investment instruments 32 in SMA 12, less liabilities attributable to SMA 12 and after deduction of the management fees. According to certain embodiments, index server 40 and/or manager server 30 is operable to value each SMA 12 as of the close of trading on each business day.

Manager server 30 and/or index server 40 may determine the value of SMA index 14 based at least in part on the respective value of each SMA 12 associated with SMA index 14. Manager server 30 and/or index server 40 may determine the value of SMA index 14 as the weighted average of the values of each SMA 12 that is associated with SMA index 14. In some embodiments, manager server 30 and/or index server 40 may determine the value of SMA index 14 according to the following formula, which may be stored in manager memory 48 and/or index memory 58:

$$SMA \text{ Index} = \frac{\sum_{i=1}^{n} SMA \text{ Account Value}_i * SMA \text{ Weight}_i}{\sum_{i=1}^{n} SMA \text{ Weight}_i}$$

In the foregoing formula, SMA Account Value refers to the current value of a respective SMA 12 and SMA Weight refers to a weight associated with the respective SMA 12. Thus, SMA index 14 may represent a weighted average of each SMA that is associated with SMA index 14.

In some embodiments, market makers may sell futures contracts, forwards, options, structured notes, and/or other suitable investment instruments 32 that are associated with master index 16. In certain instances, a particular market maker may wish to hedge the particular market maker's short position in the futures contracts. To hedge this short position, the market maker may take a long position in the components that underlie master index 16. In some embodiments, the market maker may take a long position in the particular investment instruments 32 that underlie market index 18. In other embodiments, the market maker may take a long position with respect to the SMA index 14. To take a long position with respect to the SMA index 14, the market maker may acquire one or more SMAs 12 that are included in SMA index 14.

Because each SMA 12 is actively managed by a manager 38, different SMAs 12 may yield different returns. In some embodiments, a market maker that is acquiring one or more SMAs 12 to hedge a short position in futures contracts associated with master index 16 may seek some assurances regarding the anticipated returns of the acquired SMAs 12. In certain embodiments, investing system 10 may facilitate equalization swaps 36 to make the purchase of SMAs 12 more attractive to market makers. In particular, investing system 10 may impose an equalization swap requirement on each SMA 12 associated with SMA index 14. Under the terms of the equalization swap requirement, owner 34 of a particular SMA 12 may be obligated to pay to a equalization swap counterparty the return on the particular SMA 12 and, in exchange, equalization swap counterparty may be obligated to pay owner 34 the return on SMA index 14. In some embodiments, owner 34 of the particular SMA 12 may be further obligated to pay to equalization swap counterparty a fee for executing the equalization swap 36. By obligating owners 34 of SMAs 12 to execute equalization swaps 36, investing system 10 may ensure that each owner 34 receives the return on SMA index 14.

An example illustrates certain embodiments. Investing system 10 comprises three SMAs 12—SMA X, SMA Y, and SMA Z—that are associated with SMA index 14. In the present example, investing system 10 is configured to execute equalization swaps 36 on each rebalancing date. In this example, on the prior rebalancing date, SMA X had a value of 10, SMA Y had a value of 12, and SMA Z had a value of 10. In the present example, the value of SMA index 14 on the prior rebalancing date was 10.67 (i.e., (10+12+10)/3). By the present rebalancing date, SMA X has increased by 10% to a value of 11, SMA Y has increased by 5% to a value of 12.6, and SMA Z has increased by a 5% to a value of 10.5. Accordingly, on the present rebalancing date, SMA index 14 is 11.37 (i.e., (11+12.6+10.5)/3)—an increase of 6.5625% since the prior rebalancing date.

In the present example, under the terms of the equalization swap 36, owner 34 of SMA X is obligated to pay to equalization swap counterparty a value of 0.34375 (i.e., 10×(0.10−0.065625)). Owner 34 of SMA Y is entitled to receive from equalization swap counterparty a value of 0.18750 (i.e., 12×(0.065625−0.05)). Owner 34 of SMA Z is entitled to receive from equalization swap counterparty a value of 0.15625 (i.e., 10×(0.065625−0.05)). Thus, each owner 34 effectively pays to equalization swap counterparty the return on the particular SMA 12 and, in exchange, equalization swap counterparty effectively pays owner 34 the return on SMA index 14. Accordingly, the equalization swap requirement associated with SMAs 12 ensures that each owner 34 receives a return that corresponds to the return of SMA index 14.

The foregoing example is a simplified example that merely illustrates the overall effect of an equalization swap 36. It should be understood, however, that SMA index 14 may be calculated based on a weighted average basis. It should be further understood that, under the terms of the equalization swap 36, a party may be obligated to pay to the equalization swap counterparty a fee for the swap 36. In some embodiments, investing system 10 may require that all equalizations swaps 36 be transacted with a single equalization swap counterparty. The equalization swap counterparty may be a bank, fund manager, corporation, market maker, and/or other suitable market participant.

In some embodiments, investing system 10 may require that a particular SMA 12 satisfy eligibility criteria in order to be included in SMA index 14. The eligibility criteria may require a particular SMA 12 to satisfy a minimum investment amount, may require manager 38 of SMA 12 to comply with investing guidelines 46, may require owner 34 of SMA 12 to represent and warrant that owner 34 will enter into and maintain an equalization swap 36 with an equalization swap counterparty, and/or may require SMA 12 to comply with any suitable criteria.

It should be understood that the internal structure of investing system 10 is malleable and can be readily changed, modified, rearranged, or reconfigured to achieve the intended operations of investing system 10. Although particular functions are described in conjunction with particular servers or entities in investing system 10, it should be understood that the particular functions may be performed by any suitable number and combination of servers, agents, or components associated with any suitable entity.

Figure 3:
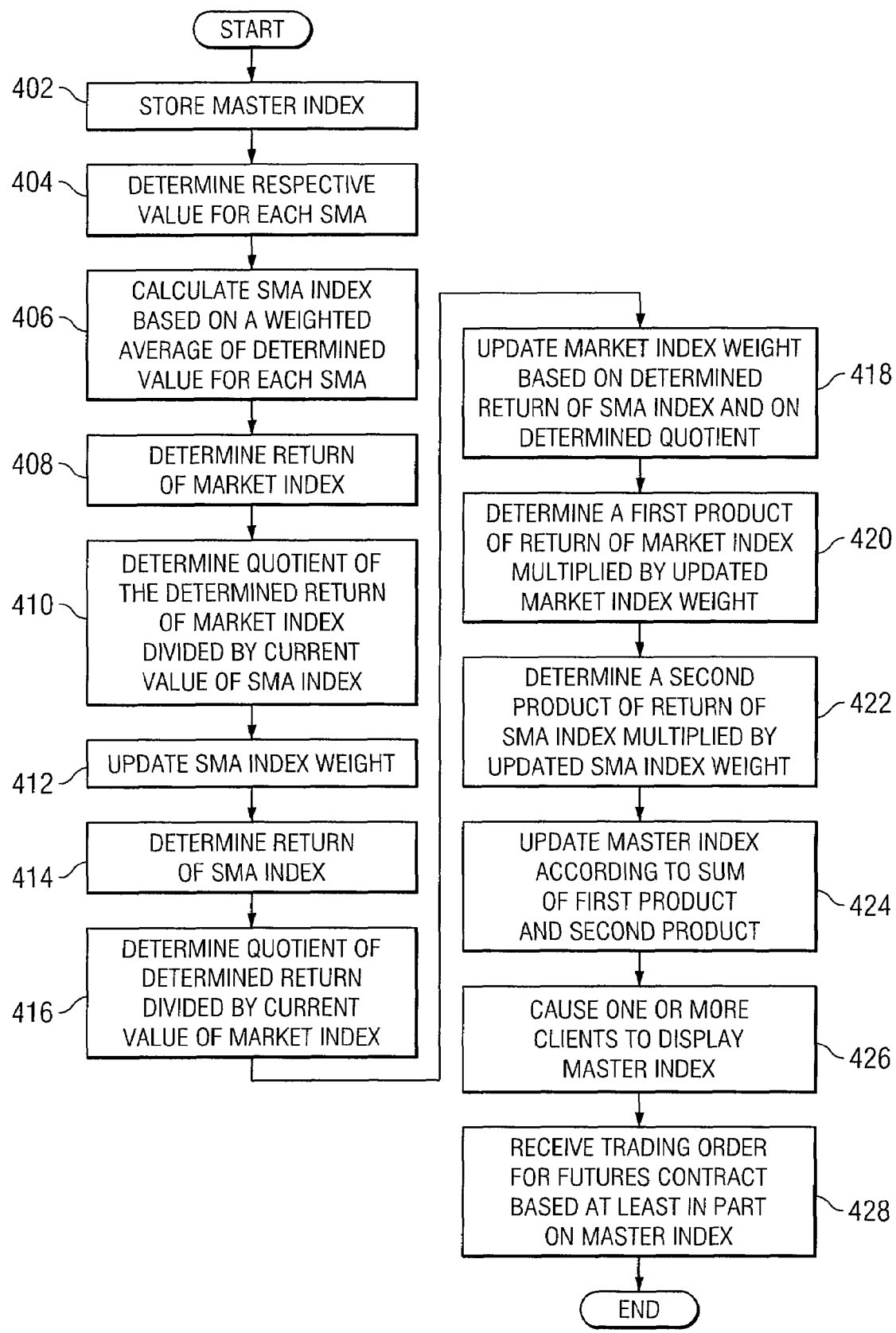
FIG. 3 illustrates a step diagram for rebalancing a master index, according to certain embodiments.

FIG. 3 illustrates a step diagram for rebalancing master index 16, according to certain embodiments. The method begins at step 402 by storing a master index 16 that is based at least in part on SMA index 14, market index 18, SMA index weight 28, market index weight, and financing value 24. In some embodiments, financing value 24 represents a financing cost associated with obtaining exposure to the market index 18 and the SMA index 14. At step 404, index server 40 determines a respective value for each of the plurality of SMAs 12 that underlie SMA index 14. At step 406, index server 40 calculates SMA index 14 based at least in part on a weighted average of the determined values of each of the plurality of SMAs 12.

At step 408, index server 40 determines a return of market index 18 over a predetermined interval of time. At step 410, index server 40 determines a quotient of the determined return divided by a current value of SMA index 14. At step 412, index server 40 updates SMA index weight 28 based at least in part on the determined return of market index 18 and on the determined quotient. In some embodiments, updating SMA index weight 28 may comprise subtracting the determined quotient from the prior SMA index weight 28.

At step 414, index server 40 determines a return of SMA index 14 over a predetermined interval of time. At step 416, index server 40 determines a quotient of the determined return divided by a current value of market index 18. At step 418, index server 40 updates market index weight 26 based at least in part on the determined return of SMA index 14 and on the determined quotient. In some embodiments, updating market index weight 26 may comprise subtracting the determined quotient from the prior market index weight 26.

At step 420, index server 40 determines a first product of a return of the market index 18 multiplied by the updated market index weight 26. At step 422, index server 40 determines a second product of a return of the SMA index 14 multiplied by the updated SMA index weight 28. At step 424, index server 40 updates master index 16 based at least in part on the sum of the first product and the second product. At step 426, index server 40 may cause one or more clients 20 to display master index 16. At step 428, index server 40 may receive a trading order for a futures contract based at least in part on master index 16. The method then ends.

Although the present invention has been described in detail, it should be understood that various changes, substitutions, and alterations can be made hereto without departing from the scope of the invention as defined by the appended claims.

What is claimed is:

1. A system, comprising:
a memory operable to store a master index that is based at least in part on:
 a separately managed account (SMA) index;
 a market index;
 a first weight associated with the SMA index; and
 a second weight associated with the market index; and
a processor communicatively coupled to the memory and operable to:
 update the first weight based at least in part on the market index;
 update the second weight based at least in part on the SMA index;
 update the master index based at least in part on the SMA index, the market index, the updated first weight, and the updated second weight;
 store the updated master index in the memory; and
 facilitate processing of a trading order based at least in part on the updated master index.

2. The system of claim 1, wherein:
the first weight associated with the SMA index is updated from a prior weight associated with the SMA index; and
updating the first weight comprises:
 determining a return of the market index over a predetermined interval of time;
 determining a quotient of the determined return divided by a current value of the SMA index; and
 subtracting the determined quotient from the prior weight.

3. The system of claim 1, wherein:
the second weight associated with the market index is updated from a prior weight associated with the market index; and
updating the second weight comprises:
 determining a return of the SMA index over a predetermined interval of time;
 determining a quotient of the determined return divided by a current value of the market index; and
 subtracting the determined quotient from the prior weight.

4. The system of claim 1, wherein the master index is further based at least in part on a financing value.

5. The system of claim 1, wherein the financing value represents a financing cost associated with obtaining exposure to the market index and the SMA index.

6. The system of claim 1, wherein updating the master index comprises:
determining a first product of a return value of the market index multiplied by the updated second weight;
determining a second product of the SMA index multiplied by the updated first weight; and
adding the first product and the second product.

7. The system of claim 1, wherein:
the SMA index is based at least in part on a plurality of SMAs; and
the processor is further operable to:
 determine a respective value of each of the plurality of SMAs; and
 determine the SMA index based at least in part on a weighted average of the determined values of each of the plurality of SMAs.

8. The system of claim 7, wherein:
a particular SMA is associated with an owner; and
the processor is further operable to:
 determine a first return of the particular SMA over a configurable period of time;
 determine a second return of the SMA index over the configurable period of time; and
 execute a swap between the owner and a counterparty, wherein the swap comprises:
  transferring a first amount from the owner to the counterparty, the first amount corresponding to the determined first return; and
  transferring a second amount from the counterparty to the owner, the second amount corresponding to the determined second return.

9. The system of claim 1, wherein the processor is further operable to:
cause one or more clients to display the updated master index; and
receive a trading order for an investment instrument that is associated with the master index, wherein the investment instrument is at least one of the following:
 a futures contract;
 a forward;
 an option; and
 a structured note.

10. A method, comprising:
storing in at least one memory a master index that is based at least in part on:
 a separately managed account (SMA) index;
 a market index;
 a first weight associated with the SMA index; and
 a second weight associated with the market index;
updating the first weight based at least in part on the market index;
updating the second weight based at least in part on the SMA index;
updating the master index based at least in part on the SMA index, the market index, the updated first weight, and the updated second weight, the updating of the master index performed by at least one processor;
storing the updated master index; and
facilitating processing of a trading order based at least in part on the updated master index.

11. The method of claim 10, wherein:
the first weight associated with the SMA index is updated from a prior weight associated with the SMA index; and
updating the first weight comprises:
   determining a return of the market index over a predetermined interval of time;
   determining a quotient of the determined return divided by a current value of the SMA index; and
   subtracting the determined quotient from the prior weight.

12. The method of claim 10, wherein:
the second weight associated with the market index is updated from a prior weight associated with the market index; and
updating the second weight comprises:
   determining a return of the SMA index over a predetermined interval of time;
   determining a quotient of the determined return divided by a current value of the market index; and
   subtracting the determined quotient from the prior weight.

13. The method of claim 10, wherein the master index is further based at least in part on a financing value.

14. The method of claim 10, wherein the financing value represents a financing cost associated with obtaining exposure to the market index and the SMA index.

15. The method of claim 10, wherein updating the master index comprises:
   determining a first product of a return value of the market index multiplied by the updated second weight;
   determining a second product of the SMA index multiplied by the updated first weight; and
   adding the first product and the second product.

16. The method of claim 10, wherein the SMA index is based at least in part on a plurality of SMAs, and further comprising:
   determining a respective value of each of the plurality of SMAs; and
   determining the SMA index based at least in part on a weighted average of the determined values of each of the plurality of SMAs.

17. The method of claim 16, wherein a particular SMA is associated with an owner, and further comprising:
   determining a first return of the particular SMA over a configurable period of time;
   determining a second return of the SMA index over the configurable period of time; and
   executing a swap between the owner and a counterparty, wherein the swap comprises:
      transferring a first amount from the owner to the counterparty, the first amount corresponding to the determined first return; and
      transferring a second amount from the counterparty to the owner, the second amount corresponding to the determined second return.

18. The method of claim 10, further comprising:
causing one or more clients to display the updated master index: and
receiving a trading order for an investment instrument that is associated with the master index, wherein the investment instrument is at least one of the following:
   a futures contract;
   a forward;
   an option; and
   a structured note.

19. A computer readable medium comprising software that, when executed by a processor, is operable to:
store a master index that is based at least in part on:
   a separately managed account (SMA) index;
   a market index;
   a first weight associated with the SMA index; and
   a second weight associated with the market index;
update the first weight based at least in part on the market index;
update the second weight based at least in part on the SMA index:
update the master index based at least in part on the SMA index, the market index. the updated first weight, and the updated second weight;
store the updated master index; and
facilitate processing of a trading order based at least in part on the updated master index.

20. The computer readable medium of claim 19, wherein:
the SMA index is based at least in part on a plurality of SMAs; and
the software is further operable when executed to:
   determine a respective value of each of the plurality of SMAs; and
   determine the SMA index based at least in part on a weighted average of the determined values of each of the plurality of SMAs.

* * * * *